United States Patent [19]

Lefebvre et al.

[11] Patent Number: 5,075,779

[45] Date of Patent: Dec. 24, 1991

[54] APPARATUS AND METHOD FOR INTERPRETING IMAGE DATA FOR USE IN A RASTER PLOTTER

[75] Inventors: J. Brett Lefebvre, Lowell, Mass.; Glenn E. Cabana, Derry, N.H.

[73] Assignee: Intergraph Corporation, Huntsville, Ala.

[21] Appl. No.: 514,032

[22] Filed: Apr. 27, 1990

[51] Int. Cl.⁵ .................. H04N 1/419; H04N 1/23
[52] U.S. Cl. ....................... 358/298; 358/261.1; 358/450; 358/456; 358/464; 358/467
[58] Field of Search ............... 358/261.1, 298, 429, 358/448, 450, 453, 455, 458, 452, 456, 462, 464, 467, 261.4

[56] References Cited

U.S. PATENT DOCUMENTS

| | | | |
|---|---|---|---|
| 4,775,886 | 10/1988 | Hirosawa | 358/298 |
| 4,807,044 | 2/1989 | Kikuchi et al. | 358/448 |
| 4,896,208 | 1/1990 | Moriya et al. | 358/450 |
| 4,947,260 | 8/1990 | Reed et al. | 358/450 |
| 4,949,188 | 8/1990 | Sato | 358/448 |

Primary Examiner—Benjamin R. Fuller
Assistant Examiner—Scott A. Rogers
Attorney, Agent, or Firm—Bromberg & Sunstein

[57] ABSTRACT

A system for efficiently generating on a raster line plotter an image that is made up of a plurality of characters, or other objects, based on an opaque ink model. Information relating to the characters is run length encoded, so as to form tone run records corresponding to the raster lines. The tone run records contain information relating to tone value, starting location, length and screen selection. The information is then processed so as to delete, or overwrite, tone value and screen selection information of the portions of characters that underlie other characters. After the appropriate information has been deleted, the remaining screen selection and tone value information is used to create a halftone image.

16 Claims, 7 Drawing Sheets

TRR: (TONE VALUE, SCREEN VALUE, START PIXEL, LENGTH)

$A_2 : (t_A, s_A, x_6, l_{A2})$
$A_1 : (t_A, s_A, x_2, l_{A1})$
$B_2 : (t_B, s_B, x_7, l_{B2})$
$B_1 : (t_B, s_B, x_3, l_{B1})$
$I_1 : (t_W, s_W, x_1, l_{I1})$

BINARY TREE SORT

MTRR: (TONE VALUE, SCREEN VALUE, LENGTH)

$I_1' : (t_W, s_W, l_{I1}')$
$A_1 : (t_A, s_A, l_{A2})$
$I_2' : (t_W, s_W, l_{I2}')$
$A_2 : (t_A, s_A, l_{A2})$
$B_2' : (t_B, s_B, l_{B2}')$
$I_3' : (t_W, s_W, l_{I3}')$

APPARATUS AND METHOD FOR INTERPRETING IMAGE DATA FOR USE IN A RASTER PLOTTER

TECHNICAL FIELD

This invention relates generally to methods and devices for the conversion of image information for use in a raster plotter. The invention is particularly directed towards converting image information that is based on an opaque ink model, wherein objects may overlay each other.

BACKGROUND ART

FIG. 1 shows an image based on the opaque ink model. The image is composed of two objects, the characters "A" and "B", having two different colors; "A" may be blue, and "B" may be red. In this example the character "B" is said to be superior to the character "A" (and conversely, the character "A" is said to be inferior to "B"), because the red of "B" is printed instead of the blue ink of "A" where the two objects overlap. Thus, in the final image it appears that the ink making up the object "B" is opaque (i.e., it does not blend with any ink that may be underlying it) and that the ink of "B" overlays the ink of the object "A", so that the ink of "A" cannot be seen.

If the characters are a shade of grey or have a color other than black, they are halftone screened, a process well known in the art, which uses dots of different sizes in order to create the image. In multicolor work typically three colored inks in addition to black ink are used in order to create the desired colors. The halftone dots of each color are typically arranged in a grid, which is referred to in the art as a screen. In order to avoid moire effects, these screens are rotated with respect to each other. Means for generating these rotated screens are well known in the art.

In a typical prior art system for interpreting image information, tone values, which represent the shade of grey or the intensity of a color and which are typically stored in a display list, are screened 21, as shown in FIG. 2. The operator chooses a screen with respect to which the tone values are to be screened, e.g., a grid rotated 15° and having a dot frequency of 150 dots per inch. The output of this screening, which is typically done in software, is a long string of bits, indicating whether or not ink should be applied at a certain point, known as a pixel, in the image. The next step 22 in the prior art system shown in FIG. 2 is the insertion of these bits into a bit map. For images based on the opaque ink model, bits representing inferior objects are inserted into the bit map first, so that bits representing a superior object will overlay the bits representing an inferior object, thereby overwriting the inferior bits. After all the bits have been read into the bit map, the bit map may then be used to control the plotter. Because this prior art system performs most of the processing of the image information at the bit level, a good deal of processing must be performed during screening and plotting, especially when the output has high resolution.

DISCLOSURE OF INVENTION

The invention is an improvement over prior art methods and systems for converting information regarding an image that is made up of superior and inferior objects based on the opaque ink model, so that the information may be read by a plotter using a beam. The invention deletes, before the information is bit-mapped or before the image is screened, information relating to the tone values of those portions of the inferior objects that underlie superior objects, while preserving information relating to the tone values of those portions of objects that do not underlie superior objects. In a preferred embodiment the image is screened based on the preserved tone value information, and beam control commands are created.

In the invention the image information is run length encoded so that the image is essentially divided into tone runs corresponding to the raster lines, and the image information is accordingly organized into tone run records. Each tone run record contains information relating to (a) tone value of the tone run, (b) starting location of the tone run and (c) length of the tone run. The tone run records can also contain information regarding which screen should be selected for screening the tone values. In one embodiment the tone run records are listed so that records relating to superior objects are listed before records relating to inferior objects. Then, the tone run records are sorted, preferably through a binary tree sort, so as to (i) eliminate tone run records relating to tone runs that are in their entirety inferior to one or more other tone runs and (ii) modify tone run records relating to tone runs only part of which are inferior to one or more other tone runs. Once the unnecessary image information is eliminated by the sort, the tone values are screened so as to produce pixel records representing pixels in a raster line and containing beam control information.

In another embodiment, the tone value information (and preferably the screen selection information) from the run-length-encoded tone run records is stored in a memory representing pixels in a raster line. The tone value (and, if appropriate, the screen selection value) for the most inferior object, which is typically the background, is read into the raster line memory first. Then, the tone value (and, if appropriate, the screen selection value) for the next most inferior object is read into the appropriate pixel records in the raster line memory, thereby overwriting the information relating to more inferior objects. This process continues until the tone values for all the objects are read into the raster memory. Then, the tone value information is converted into beam control information. The tone value information can be screened, and the screen selection value, if available, can be used to choose the appropriate screen.

DESCRIPTION OF SPECIFIC EMBODIMENTS

Figure 3:
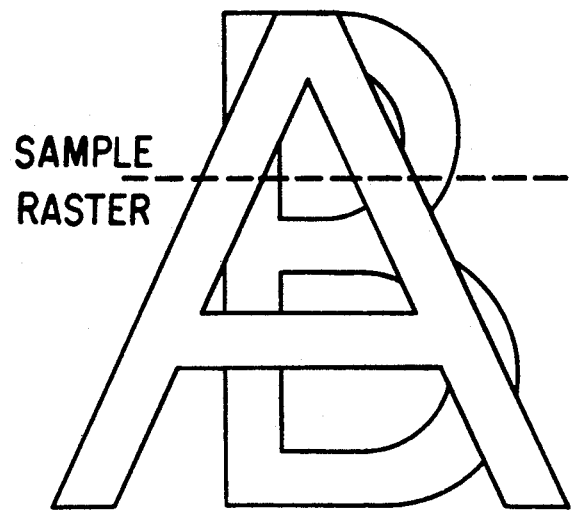
FIG. 3 shows two objects printed using the opaque ink model and a sample raster line passing through them.

FIG. 3 shows an image wherein the object "A" is superior to the object "B". The two objects may have different colors. The image is typically described by a page description language, and information regarding an image is stored in a page description language file. Many such page description languages exist (including for example PCL and Interpress.) One high level interpretive page description language is called PostScript (a registered trademark of Adobe, Inc. of Mountain View, Calif.). In PostScript the information regarding the generated image is stored in what is called a Postscript file. A PostScript file may describe a page containing text, graphics and bit-mapped images, collectively referred to as objects. Where the various image objects are stored in the PostScript file, or other page description language file, is independent of the spatial location of the object in the image. E.g., an item in the lower right corner of the image might be in the top of the file, an item in the upper left corner may be in the middle, and an item in the middle of the image may be stored at the end of the file. Thus, the order of the items in the file is not important to the spatial location of the items; the file contains spatial coordinates for each item. The order of the items in the file is important in that items inserted into the file last (and therefore typically inserted at the top of the file) are considered to overlay items in the same spatial position that were previously inserted into the file.

Figure 1:
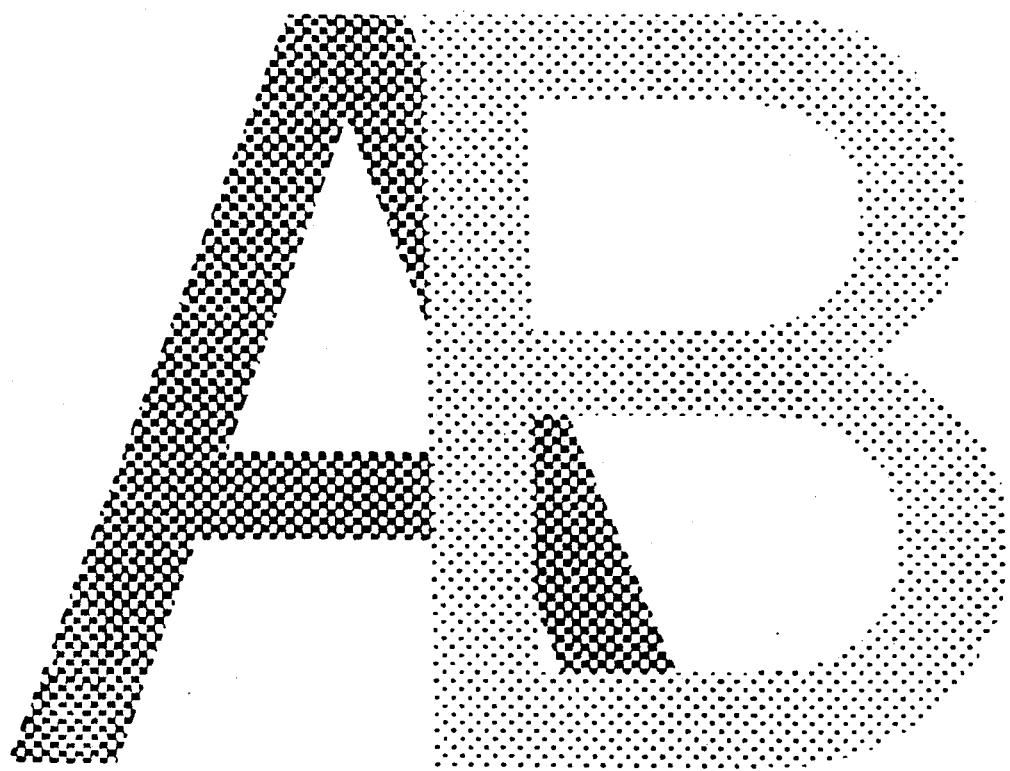
FIG. 1 shows two differently colored objects printed using the opaque ink model.
Figure 2:
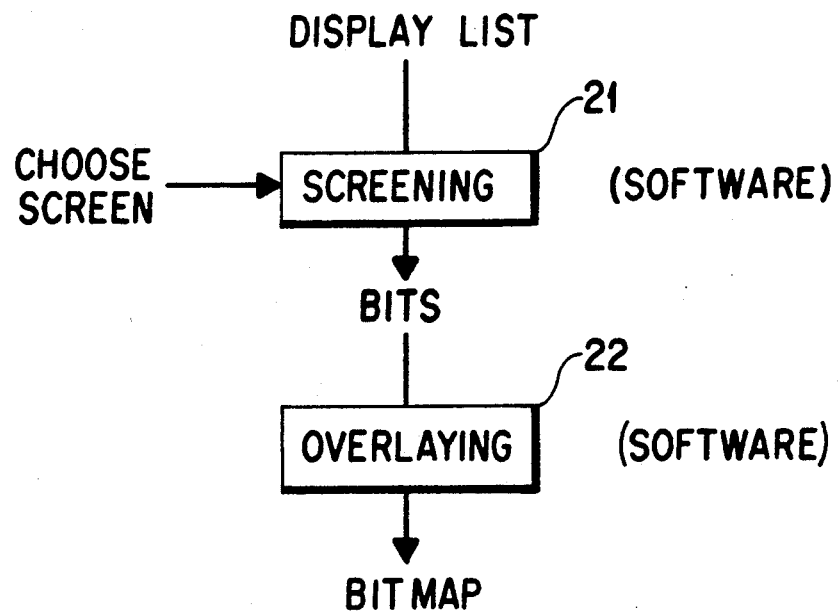
FIG. 2 shows a flowchart of a typical prior art system for screening image information.

In the prior art display lists describing all the objects that fall on a given raster line are developed from the page description language files. Like the files the display list locates all the objects spatially (with coordinate information) and temporally (by the location in the display list). In the prior art the information in the display lists was screened and then read into a bit map, as shown in FIG. 2. Because much of the information written into the bit map is overwritten in the prior art, prior art systems require a large amount of CPU processing to build and rebuild the bit map. In the present invention, all the unnecessary information is deleted, so the bit map is built up once and does not have to be rebuilt.

Figure 4:
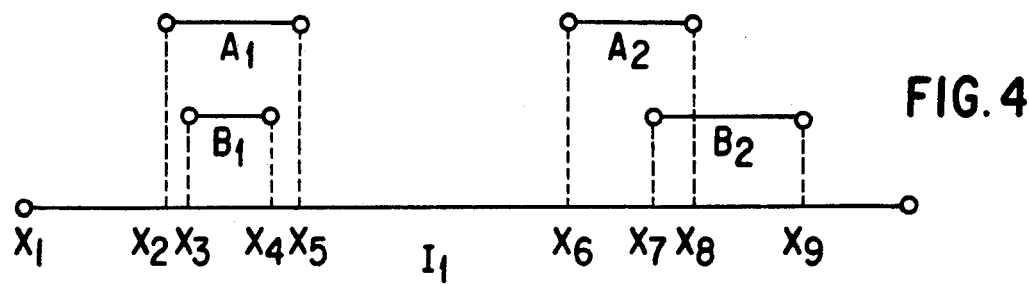
FIG. 4 depicts the spatial and temporal position of the tone runs on the sample raster line shown in FIG. 3.

The present invention run length encodes the information in a display list. Thus, the objects in the image are essentially divided up into what is called tone runs that correspond with the raster lines of the plotter. Run length encoding is a relatively simple process that is well known in the art and previously used in making maps and printed circuit boards, where the opaque ink model of image formation was not used. FIG. 3 shows a sample raster line. FIG. 4 shows the tone runs that would be associated with the sample raster line in the FIG. 3 image. The tone runs $A_1$ and $A_2$ represent that portion of the object "A" lying on the sample raster line. Tone runs $B_1$ and $B_2$ represent that portion of the object "B" lying on the sample raster line. In addition another tone run is created to represent the background. In FIG. 4 this tone run is represented as $I_1$. This background tone run, $I_1$, is, as will be seen later, important in a preferred embodiment of the invention for maintaining spacing between tone runs on a raster line that do not overlap each other.

Figure 5:
FIG. 5 shows how the tone run records are modified by the binary tree sort.

Associated with each tone run is a tone run record. The tone run records associated with the tone runs shown in FIG. 4 are depicted in the top of FIG. 5. Each tone run record preferably has four fields for storing four values: tone value (t), screen selection value (s), starting pixel address (x) and length of the tone run (1). This information is derived from the display list. The tone value represents the shade of grey or other color in the tone run. The screen selection value represents which screen, out of a number of different screens, that is to be used for screening this tone run. (If all the tone panels for a given page are to be screened at the same angle and dot frequency, then a screen selection value for every tone run is not necessary. A screen selection value field may not be needed in such a situation, and instead a single screen selection command can be given for the entire page.) The different screens may be rotated at different angles and/or have different dot frequencies. The starting pixel address indicates where on the raster line the tone run begins. The length value indicates how long the tone run is. The length information can also be stored as the ending pixel address, if the tone run records have ending pixel address fields instead of length fields. Length information is essentially equivalent to end information.

It will be seen from the tone run records listed in the top of FIG. 5 that the tone values are used for tone runs $A_1$ and $A_2$ are the same, as are the screen selection values for these two runs. Likewise, the tone values and the screen selection values for tone runs $B_1$ and $B_2$ are the same. In many cases the color of the background, $I_1$, will simply be white or the color of the paper. Referring to FIG. 4 it can be seen that the whole length of tone run $B_1$ is inferior to another tone run, namely $A_1$. Tone run $B_2$ is in part inferior to tone panel $A_2$. Much of tone run $I_1$ is inferior to other tone runs. It will be appreciated that, if those tone runs that are completely inferior to other tone runs and those parts of tone runs that are inferior to other tone runs are eliminated before screening and/or bit-mapping, a great deal of processing time can be eliminated during screening and/or bit-mapping.

In order to eliminate the unnecessary information that results from objects overlaying each other, a binary tree sort is performed. In order to perform the binary tree sort the tone run records are listed starting with the tone run record, or records, of the most superior object. Then the tone run records for the second most superior object are listed. The last tone run record is in this case the tone run record representing the background. This way of listing the tone run records from superior to inferior, is exactly opposite the way the information was processed in the prior art systems. The prior art systems typically processed the information regarding the most inferior object first. As noted above, page description language files typically have the image objects listed from superior to inferior and thus have been processed from the bottom up in prior art systems. The present invention processes the files, creating a list of tone run records, by working from the top of the file down. During the binary tree sort, the start and end information for the tone runs is modified, until there is only one record representing each pixel in the raster line. Appendix A contains a source code listing, written in C, for performing the binary tree sort. The FOR statement:

for ($i=1$; $i<xtp->$count; $i++$, $xrun--$ )

indicates that the sort is done from the top down.

Figure 6A:
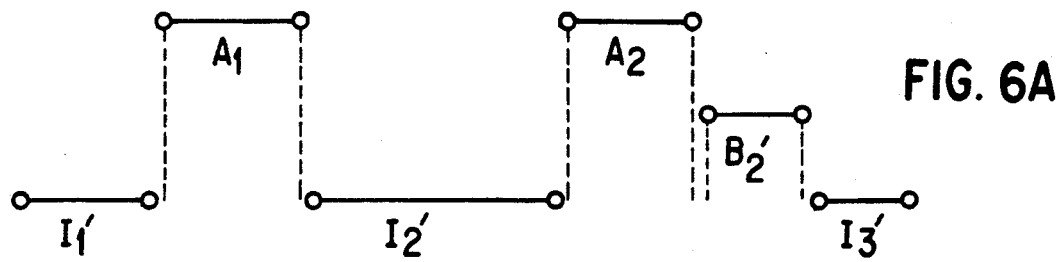
FIGS. 6A and 6B show how the tone runs shown in FIG. 4 are modified by the invention.

After performing the binary tree sort on the listed tone run records, all the unnecessary information is eliminated or clipped, as shown in FIG. 6A. As can be seen in FIG. 6A one tone run is eliminated, $B_1$, and some are modified, $I_1$ and $B_2$. The $I_1$ tone run is divided into three tone runs, $I'_1$, $I'_2$ and $I'_3$. The tone run $I'_1$ has the same starting point as the original tone run $I_1$ but has a different length. The tone run $B'_3$ has a new starting point and a new length.

Figure 6B:
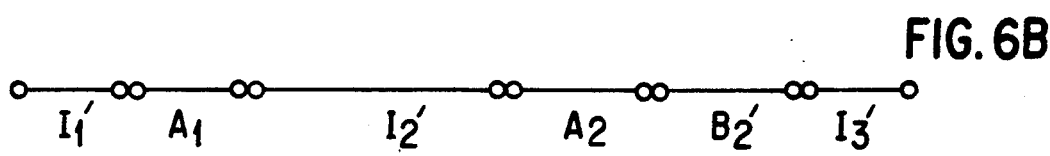
Figure 6C:
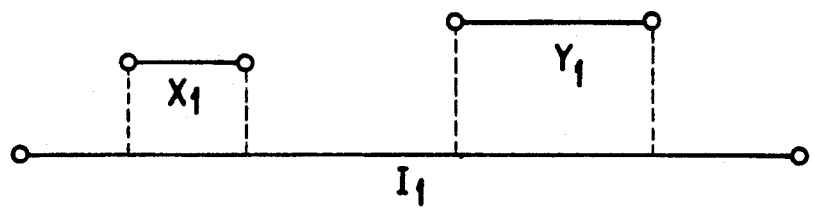
FIGS. 6C and 6D show another example of how the tone runs are modified by the invention.
Figure 6D:
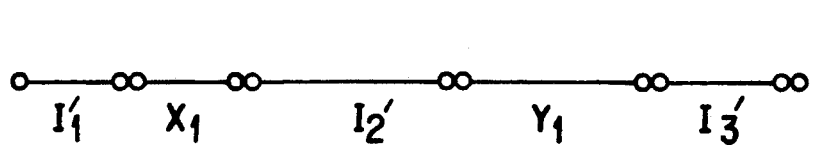

Because a tone run record was used to represent the entire background, $I_1$, every pixel in the raster line is covered by a tone run. Because of this and because all the unnecessary image information has been eliminated, it is no longer necessary to save the starting pixel address information in the tone run records. FIG. 6B shows that after the binary tree sort each tone run starts right after the end of the previous tone run, except for the first tone run which starts at the beginning of the raster line. Thus, in a preferred embodiment of the invention, after the tone run records have been sorted, their starting pixel address information is deleted. In addition to providing tone value information regarding the background, the background tone run serves the purpose of maintaining the appropriate spacing between tone runs that do not overlap, even though the starting pixel address information has been eliminated after sorting. FIG. 6C shows an example of an image with two objects $X_1$ and $Y_1$ that do not overlap and having a background $I_1$. $Y_1$ happens to be superior to $X_1$, but this fact is not important in the final image because they do not overlap. After the tone run records representing the three original tone runs, $X_1$, $Y_1$ and $I_1$, have been sorted, five modified tone runs are created, $I'_1$, $X_1$, $I'_2$, $Y_1$ and $I'_3$. As can be seen from FIG. 6D, the tone run record representing the background permits the proper positioning and spacing of the two objects $X_1$ and $Y_1$ in the final image without the need of a starting pixel address field.

Figure 7:
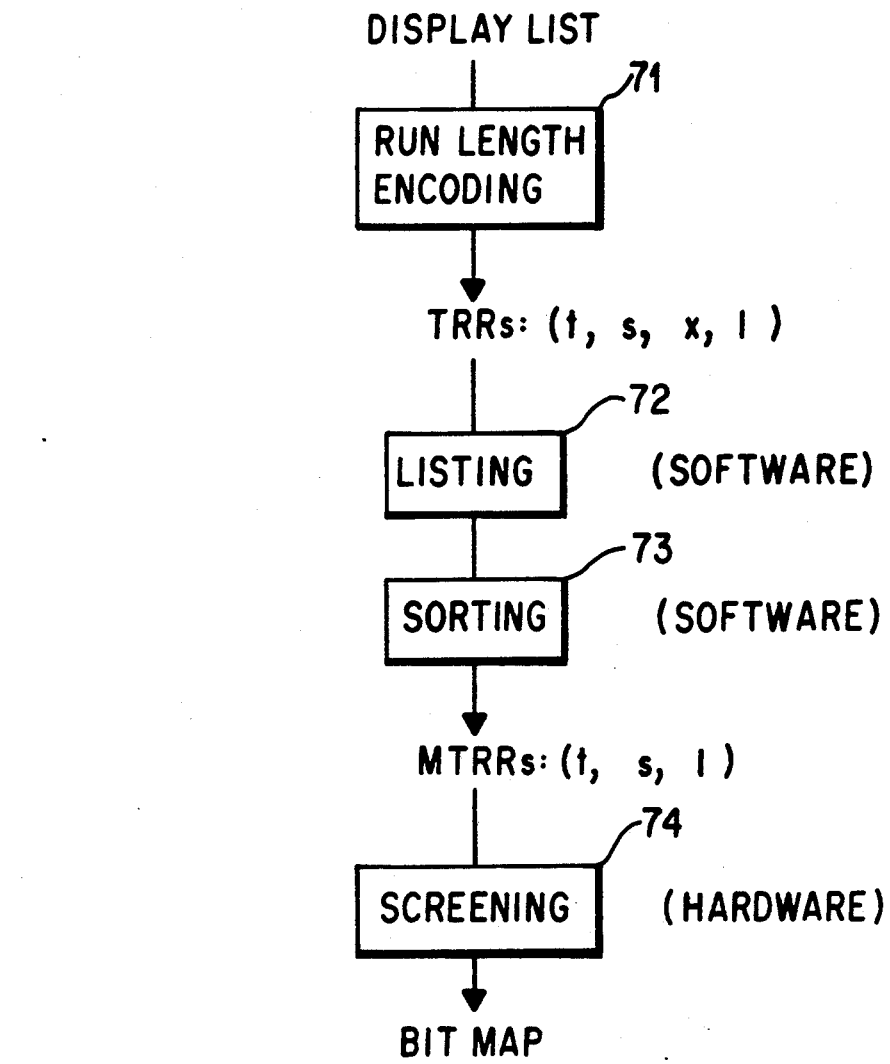
FIG. 7 shows a flowchart of one embodiment of the invention.

FIG. 7 shows a flow chart describing the process of interpreting the image information. After the original image information has been run length encoded 71 to form tone run records (TRRs) these tone run records are listed 72, as described above, and then sorted 73 by means of a binary tree sort. Preferably, the listing and sorting functions are done in software. The result of the listing and sorting are modified tone run records (MTRRs) that contain information relating to tone value, screen selection and length of the tone run. Using the information stored in the modified tone run records the image information can be screened 74. (If the image contains objects that are already bit-mapped, these objects do go through the screening process but are not modified. The bit map describing such objects may nevertheless have to be modified in order to match the resolution of the plotter.) The output of the screening can be stored in a bit map suitable for being read by a raster plotter.

Figure 8:
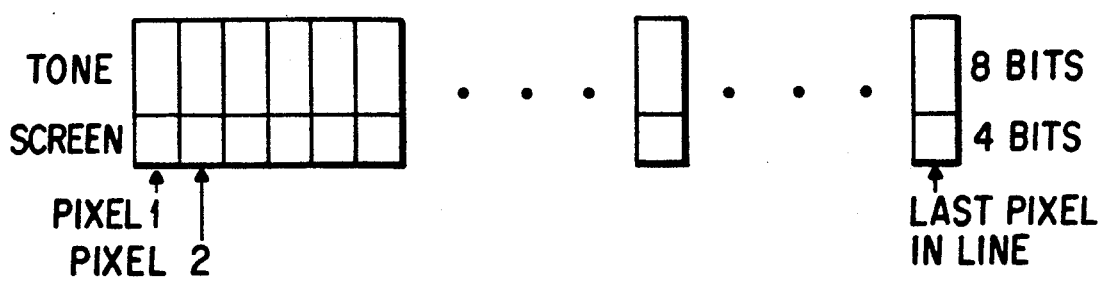
FIG. 8 shows a schematic of a raster line memory.

In another embodiment of the invention, the tone run records are processed in hardware, instead of being sorted in software. FIG. 8 shows a raster line memory, which is divided into records for each pixel in the line and which can be used in this embodiment of the invention. Unlike the system shown in FIG. 7, this system accesses the most inferior tone run record first. Thus, the line memory shown in FIG. 8 is first filled with the information regarding the background. As can be seen in FIG. 8, part of each pixel record in the raster line memory is dedicated to storing the tone value, and another portion is dedicated to storing the screen selection value. Preferably, for each pixel record 8 bits are allocated for the tone value and 4 bits for the screen selection value; however, if it is desired to choose from a larger number of screens, or if more gradations in the tone values are desired, then, of course, more bits can be allocated to these fields. (Alternatively, as noted above, it may not be necessary to store separate screen selection values for each tone run; thus, a screen selection field may not be necessary in the raster line memory.) Assuming the background has the same color throughout, initially all the tone values and screen selection values will be the same for all the pixels. The tone value and screen selection value for the most inferior object (after the background) are then inserted into the raster line memory, starting at the appropriate starting pixel address and continuing for all the following pixels according to the length of the tone run (or the ending pixel address for the tone run). For these pixels the new tone values and screen selection values replace the tone values and screen selection values for the background. Likewise, for the next most inferior object, the tone values and screen selection values for that tone run are overlaid in the appropriate pixels, according to the starting pixel address and the length of the tone run. This continues until all the tone runs for the given raster line are read into the memory. As a result of this process, all the unnecessary tone value and screen selection value information is eliminated before screening.

Figure 9:
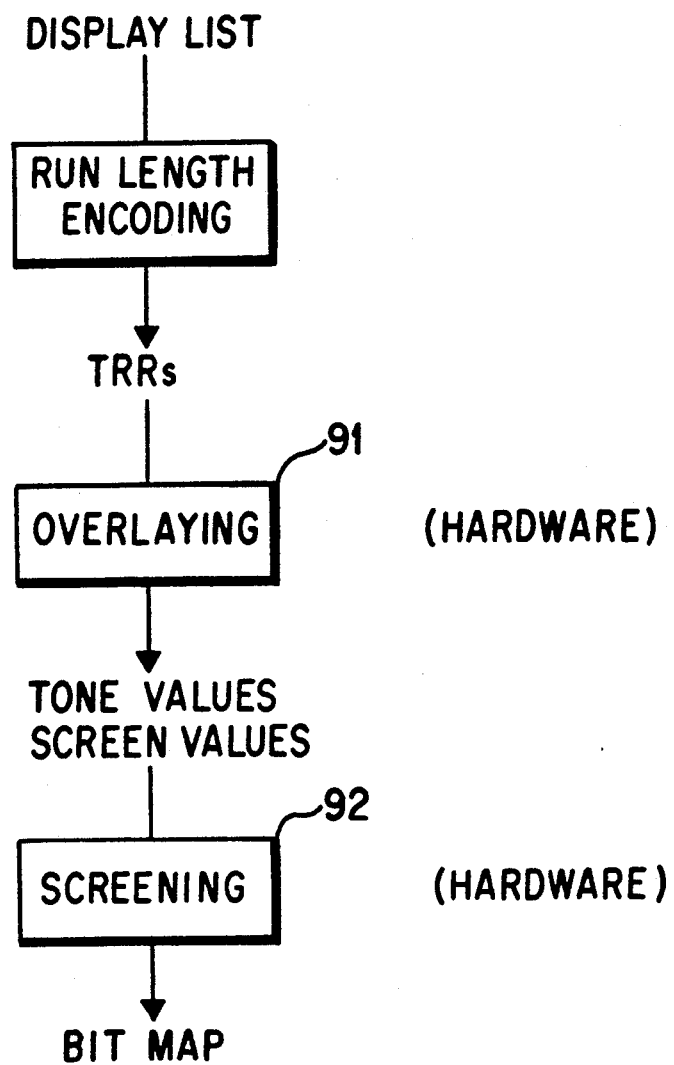
FIG. 9 shows a flowchart of another embodiment of the invention that can use the raster line memory shown in FIG. 8.

FIG. 9 shows a flowchart outlining the basic steps in this version of the invention. After the overlaying step 91 is performed on the raster line memory, the tone values are screened 92 according to the appropriate screen selection values. The output of the screening step can be a bit map indicating where ink should and should not be applied.

Figure 10:
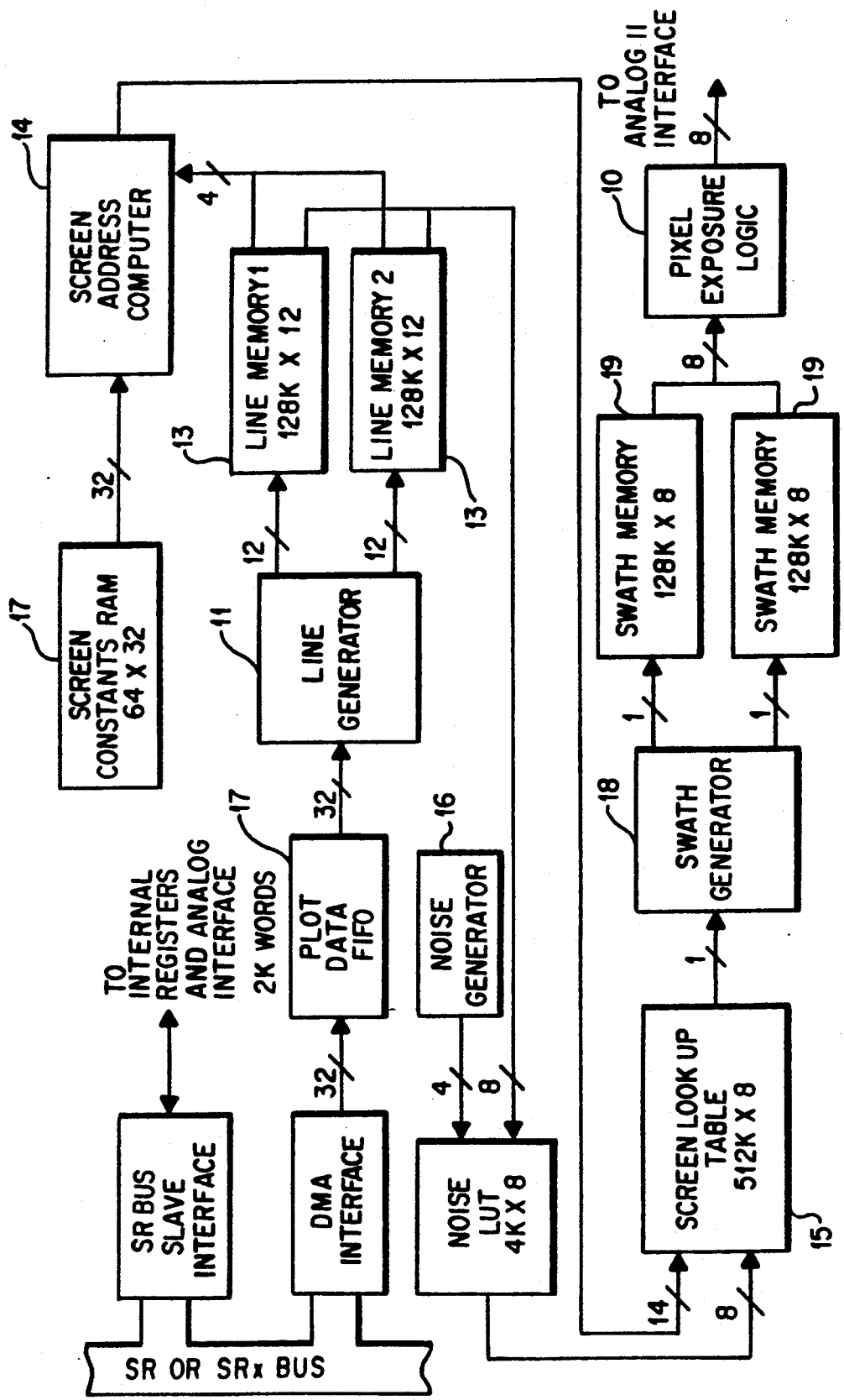
FIG. 10 shows a schematic of a preferred version of the system depicted in FIG. 9.

FIG. 10 shows in greater detail a preferred embodiment of this version of the invention. The line generator 11 performs the overlaying function; it receives data and commands from the plot data first-in-first-out memory 12 from which it constructs completed lines of unscreened data in the line memory 13. As described above, areas of the line memory are written based on the starting pixel addresses and lengths of the tone run records. The line memory 13 stores tone values and screen selection values as shown in FIG. 8. Creation of a line is begun with a start-of-line command and ended with either the next start-of-line command or an end-of-line command. A start-of-line command initializes the line memory to a background tone value and background screen selection value. The 128K-by-12 line memories 13 are alternately used by the line generator and the screen address computer 14/screen lookup table 15. While the line generator 11 builds a complete line of pixels on one line memory, the other line memory supplies screen selection information to the address computer 14 and tone values to the screen lookup table 15. The two line memories function in a ping-pong fashion. When a line construction has ended, the line memory in use is turned over to the screen computer and the alternate memory (providing that it is not busy) is to used to build the next line.

The screen address computer 14 transforms the coordinates of the pixels, which are based on a first coordinate system orthogonal to the directions of movement of the plotter's recording head, into the coordinates used to access the screen look up table 15, which are based on a second coordinate system that is usually rotated with respect to the first coordinate system. The screen address computer 14 computes the coordinates for addressing the screen lookup table 15, by utilizing constant values stored in the screen constants random access memory 17 and the current plotting coordinates, a process that is well known in the art. A change in the screen selection value requires a new set of constants. In a preferred embodiment of the invention the screen look up table 15 stores information regarding the desired intensity of the plotting beam. The screening system used in this embodiment of the invention is disclosed in copending U.S. patent application Ser. No. 07/409,114, filed Sept. 19, 1989 for an invention by Winrich Gall. The noise generator 16 optionally produces random numbers to be added to the tone values from the line memories.

A preferred embodiment of the invention plots several raster lines at a time, i.e., a swath. A swath consists of several raster lines; in the embodiment shown in FIG. 10, eight raster lines may make up a swath. The swath generator 18 receives screen data a pixel at a time from the screen lookup table 15. As noted above, the screened data represents the desired intensity of the recording beam. In a preferred embodiment of the invention, the laser beam may be modulated at intermediate intensities between off and full, as disclosed in the above-mentioned U.S. patent application Ser. No. 07/409,114. The swath memories 19 function in ping-pong fashion, one swath memory may be filled by the swath generator 18, while the other swath memory is being accessed by the pixel exposure logic 10.

The pixel exposure logic 10 ensures precise timing and pulse width of data pulses to the laser beam modulator.

APPENDIX A

```
/*******************************                     ********************
*    Prepare to write contone data to disk - BTREE sor.
***********************************************************************/ register uns16 xsb, xeb, tsb, teb;    /* Speed Up - sec */
    int i, j;
    uns16   gsb, geb;
    struct xscan_run_type *tree;
    struct xscan_run_type *root, *xrun1, *gsbp, *gebp;

root = --xrun;

tree = root;
    xrun1= root;
    xrun = root;

root->back  = NULL;
    root->left  = NULL;
    root->right = NULL;

#if RUNSTATISTICS
        totalength = 0;
endif for (i=1; i<xtp->count; i++, xrun--)
    {
       xrun->lback = (char *)xrun - sizeof(*xrun);
       xrun->back  = root;

#if RUNSTATISTICS
        totalength += xrun->eb - xrun->sb + 1;
endif
    }

'   xrun->back = root;

#if RUNSTATISTICS
        totalength += xrun->eb - xrun->sb + 1;
endif xrun = root;

/* global start and end bits */ gsb = xrun->sb;
    geb = xrun->eb;
    gsbp = gebp = xrun;
```

```
   for (i=1; i<xtp->count; i++)
   {
     xrun = xrun->lback;      /* increment the xrun   */
     tree = xrun->back;       /* reinit tree to root (sort of) */ xsb = xrun->sb;
     xeb = xrun->eb;
     tsb = tree->sb;
     teb = tree->eb;

/* Tests for quick insert... */ if (xeb < gsb) {
        tree = gsbp;
        goto G3;
     }
     else if (xsb > geb) {
        tree = gebp
        goto G4;
     }
G1:
     if (xsb < tsb)   /* left */
     {
       if (xeb < tsb) ;
       else if (xeb <= teb) {   /* partly LEFT */
          xrun->eb = tsb-1;
          xeb = tsb-1;
       }
       else   /* split */
       {
          xrun1++;
          xrun1->sb = xsb;
          xrun1->eb = tsb-1;
          xrun1->type = xrun->type;

if (xrun1->type)
             xrun1->gip.gray = xrun->gip.gray;
          else
             xrun1->gip.iptr = xrun->gip.iptr;

xrun1->lback = xrun;

xrun->sb  = teb+1;
          xrun->back = tree;      /* reinit tree to root (sort of) */
          xtp->count++;
          xrun= xrun1;
          xsb = xrun->sb;
          xeb = xrun->eb;
       }

/* to see if insert left or not */
       if (tree->left == NULL) /* empty ?? */
       {
          if (!xrun->type)
             goto G3;

if ((tsb == xeb+1) && (tree->gip.gray == xrun->gip.gray))
          {
             tree->sb = xsb;
             tsb = xsb;
             if (tsb < gsb) {
                gsb = tsb;
                gsbp = tree;
             }
          }
```

```
            else
            {
G3:
               tree->left = xrun;
               xrun->left = NULL;
               xrun->right= NULL;
               xrun->back = tree;
               if (xsb < gsb) {
                  gsb = xsb;
                  gsbp = xrun;
               }
            }
         }
         else   /* not empty */
         {
            tree = tree->left;
            tsb = tree->sb;
            teb = tree->eb;
            goto G1;
         }
      }
      else
      {
         /* do not insert, opaque */
         if (xeb <= teb)  goto G2;

else if (xsb > tsb);
            else {                    /*partly*/
               xrun->sb = teb+1;
               xsb = teb+1;
            }

/* to see if insert RIGHT or not */
         if (tree->right == NULL) /* empty ?? */
         {
            if (!xrun->type) goto G4;
            if ((teb == xsb-1) && (tree->gip.gray == xrun->gip.gray))
            {
               tree->eb = xeb;
               teb = xeb;
               if (teb > geb) {
                  geb = teb;
                  gebp = tree;
               }
            }
            else
            {
G4:
               tree->right= xrun;
               xrun->left = NULL;
               xrun->right= NULL;
               xrun->back = tree;
               if (xeb > geb) {
                  geb = xeb;
                  gebp = xrun;
               }
            }
         }
         else   /* not empty */
         {
            tree = tree->right;
            tsb = tree->sb;
            teb = tree->eb;
            goto G1;
         }
```

```
G2:
            }
        } ps_opt_screen (root);

xtp->count = 0;
        xrun = xrun_ptr;

#if RUNSTATISTICS
        sumlength += totalength;
        if (peaklength < totalength) peaklength = totalength;
#endif
}
```

What is claimed is:

1. A method for converting information, including tone value information, regarding a page described in a page description language to be re-created in halftone so that the information may be read by a plotter using a beam that can plot raster line by raster line, the page being made up of superior and inferior objects based on an opaque ink model, the method comprising the steps of:

run length encoding the page information, so that the page is essentially divided into tone runs corresponding to the raster lines, and the page information is organized into tone run records, each tone run record containing information relating to (a) tone value of the tone run, (b) starting location of the tone run and (c) length of the tone run;

deleting information relating to the tone values of those portions of the inferior objects that underlie superior objects, while preserving information relating to the tone values of those portions of objects that do not underlie superior objects; and screening the page based on the preserved tone value information so as to generate beam control commands.

2. A method according to claim 1, wherein each tone run record further includes information relating to (d) screen selection, and, as the tone value information is being deleted and preserved, information relating to the screen selection of those portions of inferior objects that underlie superior objects is deleted, and information relating to the screen selection of those portions of objects that do not underlie superior objects is preserved, and wherein the screening is based on the preserved screen selection information.

3. A method for converting information regarding a page described in a page description language to be re-created in halftone so that the information may be read by a plotter using a beam that can plot raster line by raster line and that can be controlled on a pixel by pixel basis, the page being made up of superior and inferior objects based on an opaque ink model, the method comprising the steps of:

run length encoding the page information so that the page is essentially divided into tone runs corresponding to the raster lines, and the page information is organized into tone run records, each tone run record containing information relating to (a) tone value of the tone run, (b) starting location of the tone run and (c) length of the tone run;

listing the tone run records so that records relating to superior objects are listed before records relating to inferior objects;

sorting the list of tone run records so as to (i) eliminate tone run records relating to tone runs that are in their entirety inferior to one or more other tone runs and (ii) modify tone run records relating to tone runs only part of which are inferior to one or more other tone runs; and screening the tone runs relating to the sorted tone run records, such that the sorted tone run records are converted into pixel records representing pixels in a raster line and containing beam control information.

4. A method according to claim 3, wherein each tone run record further includes information relating to (d) screen selection, and wherein the screening is based on the screen selection information.

5. A method for converting information regarding a page described in a page description language that is made up of superior and inferior objects based on an opaque ink model so that the information may be read by a plotter using a beam that can plot raster line by raster line and that can be controlled on a pixel by pixel basis, the method comprising the steps of:

run length encoding the page information so that the page is essentially divided into tone runs corresponding to the raster lines, and the page information is organized into tone run records, each tone run record containing information relating to (a) tone value of the tone run, (b) starting location of the tone run and (c) length of the tone run;

storing the information from the tone run records relating to tone values in a memory representing pixels in a raster line, so that tone value information for a pixel that is inferior to other tone value information for the same pixel is overwritten by the superior tone value; and converting the tone value information into beam control information.

6. A method according to claim 5, wherein each tone run record further includes information relating to (d) screen selection, and wherein converting the tone value information into beam control information includes screening, based on the screen selection information, the tone value information stored in the raster line memory.

7. A system for converting information, including tone value information, regarding a page described in a page description language to be re-created in halftone so that the information may be read by a plotter using a beam that can plot raster line by raster line, the page being made up of superior and inferior objects based on an opaque ink model, the system comprising:
- means for run length encoding the page information so that the page is essentially divided into tone runs corresponding to the raster lines, and the page information is organized into tone run records, each tone run record containing information relating to (a) tone value of the tone run, (b) starting location of the tone run and (c) length of the tone run;
- means for deleting information relating to the tone values of those portions of the inferior objects that underlie superior objects, while preserving information relating to the tone values of those portions of objects that do not underlie superior objects; and
- means for screening the page based on the preserved tone value information so as to generate beam control commands.

8. A system according to claim 7, wherein each tone run record further includes information relating to (d) screen selection, and
- the means for deleting and preserving information includes means for deleting information relating to the screen selection of those portions of inferior objects that underlie superior objects, while preserving information relating to the screen selection of those portions of objects that do not underlie superior objects is preserved, and
- the means for screening screens the page based on the preserved screen selection information.

9. A system for converting information regarding a page described in a page description language to be re-created in halftone so that the information may be read by a plotter using a beam that can plot raster line by raster line and that can be controlled on a pixel by pixel basis, the page being made up of superior and inferior objects based on an opaque ink model, the system comprising:
- means for run length encoding the page information so that the page is essentially divided into tone runs corresponding to the raster lines, and the page information is organized into tone run records, each tone run record containing information relating to (a) tone value of the tone run, (b) starting location of the tone run and (c) length of the tone run;
- means for listing the tone run records so that records relating to superior objects are listed before records relating to inferior objects;
- means for sorting the list of tone run records so as to (i) eliminate tone run records relating to tone runs that are in their entirety inferior to one or more other tone runs and (ii) modify tone run records relating to tone runs only part of which are inferior to one or more other tone runs; and
- means for screening the tone runs relating to the sorted tone run records, such that the sorted tone run records are converted into pixel records representing pixels in a raster line and containing beam control information.

10. A system according to claim 9, wherein each tone run record further includes information relating to (d) screen selection, and wherein the means for screening screens the tone runs based on the screen selection information.

11. A system for converting information regarding a page described in a page description language that is made up of superior and inferior objects based on an opaque ink model so that the information may be read by a plotter using a beam that can plot raster line by raster line and that can be controlled on a pixel by pixel basis, the system comprising:
- means for run length encoding the page information so that the page is essentially divided into tone runs corresponding to the raster lines, and the page information is organized into tone run records, each tone run record containing information relating to (a) tone value of the tone run, (b) starting location of the tone run and (c) length of the tone run;
- means for storing the information from the tone run records relating to tone value in a memory representing pixels in a raster line, so that tone value information for a pixel that is inferior to other tone value information for the same pixel is overwritten by the superior tone value; and
- means for converting the tone value information into beam control information.

12. A system according to claim 11, wherein each tone run record further includes information relating to (d) screen selection, and wherein the means for converting the tone value information into beam control information includes means for screening, based on the screen selection information, the tone value information stored in the raster line memory.

13. A method for converting information regarding a page described in a page description language, so that the information may be read by a plotter using a beam that can plot raster line by raster line, the page being made up of superior and inferior objects based on an opaque ink model, the method comprising the steps of:
- run length encoding the page information, so that the page is essentially divided into tone runs corresponding to the raster lines, and the page information is organized into tone run records, each tone run record containing information relating to (a) tone value of the tone run, (b) starting location of the tone run and (c) length of the tone run;
- overwriting information relating to the tone values of those portions of inferior objects that underlie superior objects with information relating to the tone values of those portions of objects that do not underlie superior objects; and
- screening the page based on the tone value information so as to generate beam control commands.

14. A method according to claim 13, wherein each tone run record further includes information relating to (d) screen selection,
- wherein the overwriting includes overwriting information relating to the screen selection of those portions of inferior objects that underlie superior objects with information relating to the screen selection of those portions of objects that do not underlie superior objects, and
- wherein the screening is further based on the screen selection information.

15. A system for converting information regarding a page described in a page description language, so that the information may be read by a plotter using a beam that can plot raster line by raster line, the page being made up of superior and inferior objects based on an opaque ink model, the system comprising:
- means for run length encoding the page information so that the page is essentially divided into tone runs corresponding to the raster lines, and the page information is organized into tone run records, each tone run record containing information relating to (a) tone value of the tone run, (b) starting location of the tone run and (c) length of the tone run;

means for overwriting information relating to the tone values of those portions of inferior objects that underlie superior objects with information relating to the tone values of those portions of objects that do not underlie superior objects; and means for screening the page based on the tone value information so as to generate beam control commands.

16. A system according to claim 15, wherein each tone run record further includes information relating to (d) screen selection, wherein the means for overwriting includes means for overwriting the screen selection information of those portions of inferior objects that underlie superior objects with information relating to those portions of objects that do not underlie superior objects, and wherein the means for screening screens the page based on the screen selection information.

* * * * *